United States Patent [19]
Muraishi

[11] 4,436,270
[45] Mar. 13, 1984

[54] SUPPORT MECHANISM OF SWIVEL SEAT STRUCTURE

[75] Inventor: Masakazu Muraishi, Higashimurayama, Japan

[73] Assignee: Nissan Motor Company, Limited, Japan

[21] Appl. No.: 277,234

[22] Filed: Jun. 25, 1981

[30] Foreign Application Priority Data

Jul. 16, 1980 [JP] Japan ................................. 55-97181

[51] Int. Cl.³ ........................................... F16M 13/00
[52] U.S. Cl. .................................. 248/416; 296/65 R
[58] Field of Search ............... 248/416, 415, 418, 430, 248/425, 429; 296/65 R, 68; 74/527; 297/349

[56] References Cited

U.S. PATENT DOCUMENTS

| | | |
|---|---|---|
| 1,903,267 | 3/1933 | Roberts . |
| 2,290,464 | 7/1942 | Buchheit .......................... 296/65 R |
| 2,297,176 | 9/1942 | Thompson ....................... 296/65 R |
| 2,864,431 | 12/1958 | Eaton .............................. 248/430 X |
| 2,868,273 | 1/1959 | Barrett ............................ 248/562 X |
| 2,992,852 | 7/1961 | Loofbourrow et al. ............. 296/68 |
| 3,104,911 | 9/1963 | James et al. ............................ 296/68 |
| 3,124,332 | 3/1964 | Heyl ................................ 248/430 X |
| 3,322,458 | 5/1967 | Bachmann ........................ 296/65 R |
| 3,338,622 | 8/1967 | Bachmann ........................ 296/65 R |
| 3,394,912 | 7/1968 | Bullen ................................... 248/430 |
| 3,572,817 | 3/1971 | Colavtti ............................ 296/65 R |
| 3,659,895 | 5/1972 | Dresden .......................... 297/349 X |
| 3,860,283 | 1/1975 | Calautti ............................ 296/65 R |
| 3,979,099 | 9/1976 | Strang ..................................... 248/418 |
| 4,008,500 | 2/1977 | Addison .......................... 297/349 X |
| 4,155,593 | 5/1979 | Swenson ......................... 297/349 X |

FOREIGN PATENT DOCUMENTS

| | | |
|---|---|---|
| 2326891 | 5/1977 | France . |
| 384641 | 3/1931 | United Kingdom . |
| 492492 | 9/1938 | United Kingdom . |
| 525663 | 9/1940 | United Kingdom . |
| 857317 | 12/1960 | United Kingdom . |
| 1368183 | 9/1977 | United Kingdom . |

*Primary Examiner*—J. Franklin Foss
*Attorney, Agent, or Firm*—Lane, Aitken & Kananen

[57] ABSTRACT

A support mechanism of a swivel seat structure having a seat cushion turnable over a floor surface, wherein the seat cushion is horizontally turnable with respect to the floor surface about the center axis of a pivot element located closer to the rear end of the seat cushion than to the front end of the seat cushion and wherein the seat cushion is retained to the floor surface between the pivot element and guide rails provided in front of the pivot element.

11 Claims, 9 Drawing Figures

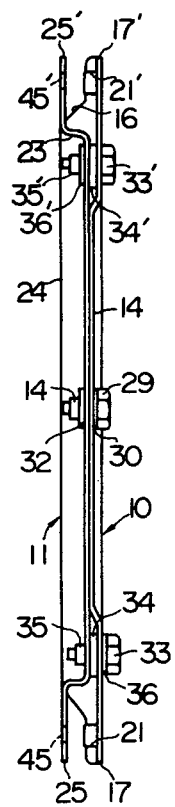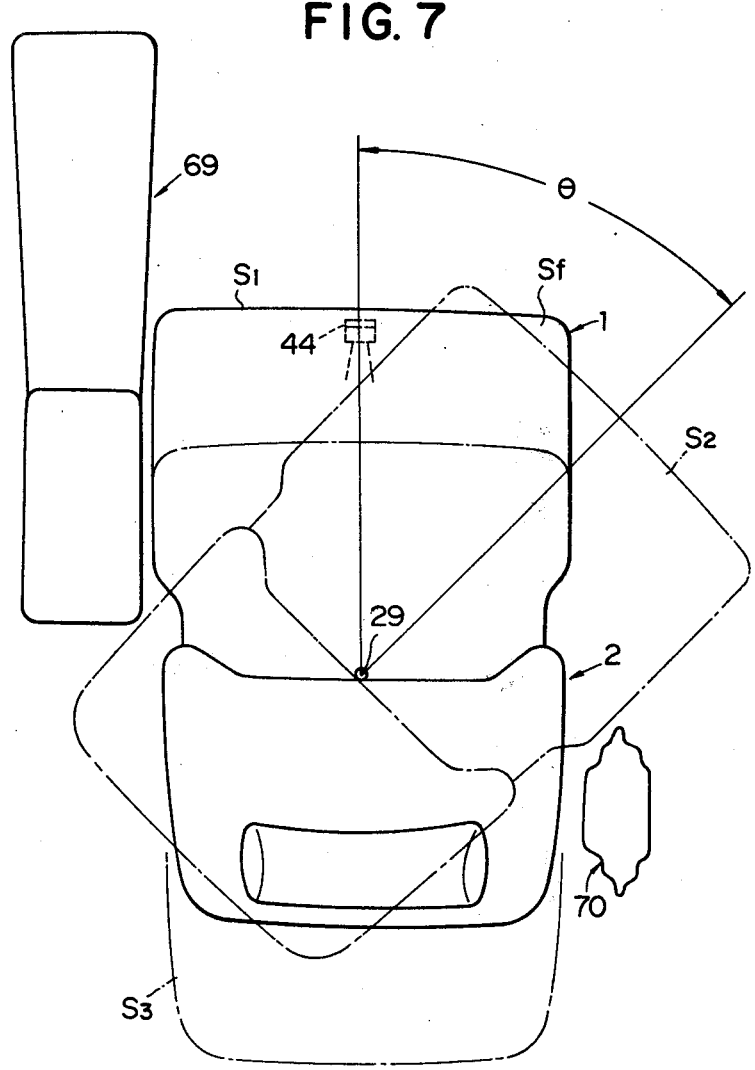
FIG. 6
FIG. 7

:A.436,270

SUPPORT MECHANISM OF SWIVEL SEAT STRUCTURE

FIELD OF THE INVENTION

The present invention relates to swivel seat structures and particularly to a support mechanism of a swivel seat structure for installation in, for example, a vehicle such as a motor vehicle.

SUMMARY OF THE INVENTION

In accordance with the present invention, there is provided a support mechanism of a swivel seat structure having a seat cushion horizontally positioned over a floor surface, comprising a pivot element located below the seat cushion and having a center axis about which the seat cushion is horizontally turnable with respect to the floor surface, the center of the pivot element being closer to the rear end of the seat cushion than to the front end of the seat cushion, guide rails positioned below the seat cushion and in front of said pivot element, and retaining means positioned between said pivot element and said guide rails and arranged to retain said seat cushion to the floor surface while permitting the seat cushion to turn about the center axis of said pivot element with respect to the floor surface. The support mechanism may further comprise a base member which is held stationary with respect to the floor surface, and a swivel member carrying the seat cushion thereon and pivotally mounted on said base member by means of the pivot element, the swivel member being horizontally turnable on the base member about the center axis of the pivot element, the above mentioned retaining means being arranged to provide retaining engagement between the base member and the swivel member while permitting the swivel member to turn on and with respect to the base member. In this instance, the aforesaid guide rails may consist of an arcuate stationary guide rail which is held stationary with respect to the floor surface and an arcuate movable guide rail which is slidable on and along the stationary guide rail and which is secured to the swivel member for being turnable with the swivel member and the seat cushion about the center axis of the pivot element.

BRIEF DESCRIPTION OF THE DRAWINGS

Drawbacks of prior-art swivel seat structures and the advantages of the support mechanism of a swivel seat structure according to the present invention will be clearly understood from the following description taken in conjunction with the accompanying drawings in which like reference numerals designate similar or corresponding elements, members and structures and in which:

FIG. 6 is a rear end view of the seat structure shown in FIG. 4, the seat structure shown in FIG. 6 being viewed in a direction indicated by arrow V in FIG. 5;

FIG. 7 is a schematic plan view showing various horizontal positions of the swivel seat structure having incorporated therein the support mechanism illustrated in FIGS. 3 to 6;

BACKGROUND OF THE INVENTION

Figure 1:
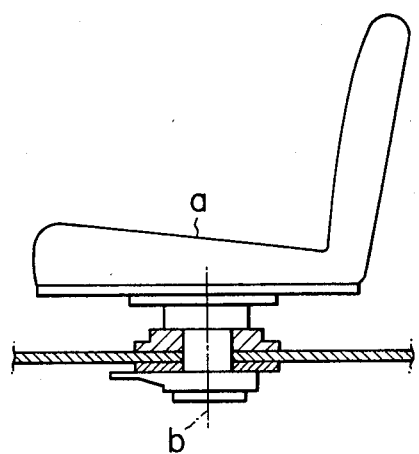
FIG. 1 is a side elevation view showing, partially in vertical section, a representative example of a prior-art swivel seat structure.
Figure 2:
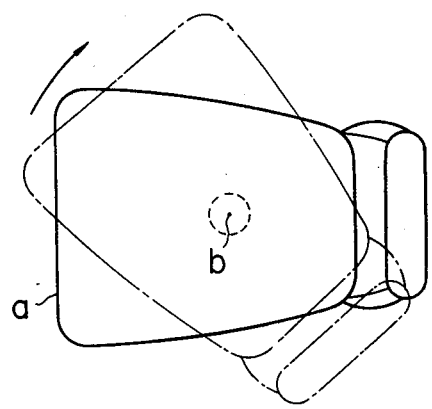
FIG. 2 is a plan view of the swivel seat structure illustrated in FIG. 1.

In FIGS. 1 and 2 of the drawings is illustrated a representative example of a prior-art swivel seat structure for use in an automotive vehicle. The seat stucture has a seat cushion a rotatable about a vertical axis b which is located below a central portion of the seat cushion a. When the seat structure thus arranged is turned about the axis b from a forwardly-facing position indicated by full lines to a sidewise-turned position indicated by dot-and-dash lines in FIG. 2, one of the front corner portions and one of the rear corner portions of the seat cushion a protrude laterally from the initial position of the seat cushion. An extra free space must therefore be provided on the inner side of the seat structure for accommodating the pivotal motion of the seat cushion a. Such a free space can not be used for the installation of, for example, a floor-mounted console box (not shown).

An improved swivel seat structure for automotive use has therefore been proposed in, for example, Japanese Patent Specification No. 40-7452 in an attempt to provide a solution to such a problem. A drawback is still involved in the priort-art seat structure disclosed therein that the shaft supporting the seat cushion is required to have such a large diameter that the cross sectional area of the shaft accounts for approximately one third of the overall area of the seat cushion. If the cushion support shaft has a smaller diameter, the seat cushion may be deformed in its entirety if the occupant of the seat sits on a front portion, especially a front corner portion of the seat cushion. Application of a localized load on such a portion of the seat cushion may, furthermore, produce a stress in a symmetrically opposite portion of the seat cushion. The stress is directed opposite to the load applied to the front or front corner portion of the seat cushion and will promote the deformation of the seat cushion. On the other hand, the enlarged diameter of the cushion support shaft results in an increase in the overall weight of the seat structure and, for this reason, extra design consideration will be indispensable for the reduction of the weight of the seat structure as a whole.

In the prior-art swivel seat structure taught in Japanese Patent Specification No. 40-7452, the seat back is secured to the vehicle body independently of the seat cushion. If, however, it is desired that the seat structure be modified to be adjustable in position in a fore-and-aft direction of the vehicle, the seat back must be secured to or constucted integrally with the seat cushion. If the seat back of such a seat structure is subjected to a violent impact applied in a rearward direction thereto by, for example, a seat occupant who is flung backward during a collision at the rear of the vehicle, the seat cushion is forced to lift at its front end and may be deformed critically.

The present invention contemplates elimination of these and other drawbacks which have thus far been inherent in prior-art swivel seat structures of the natures hereinbefore described.

DESCRIPTION OF THE EMBODIMENTS

A first embodiment of the support mechanism of a swivel seat structure according to the present invention will be hereinafter described with reference concurrently to FIGS. 3 to 6 of the drawings. The support mechanism forms part of a swivel seat structure which further comprises a seat cushion 1 and a seat back 2 secured to or integral with the seat cushion 1 as will be seen particularly from FIG. 3. The seat cushion 1 is carried together with the seat back 2 on a floor panel 3 of the vehicle body by means of the support mechanism. In the embodiment herein shown, the swivel seat structure is assumed, by way of example, as being of the type which can be adjusted in position in a fore-and-aft direction of the vehicle. Thus, the support mechansim is shown comprising a pair of longitudinal guide structures 4 and 4' longitudinally extending in fore-and-aft directions of the vehicle and spaced apart in parallel from each other as will be seen particularly from FIG. 4.

Figure 3:
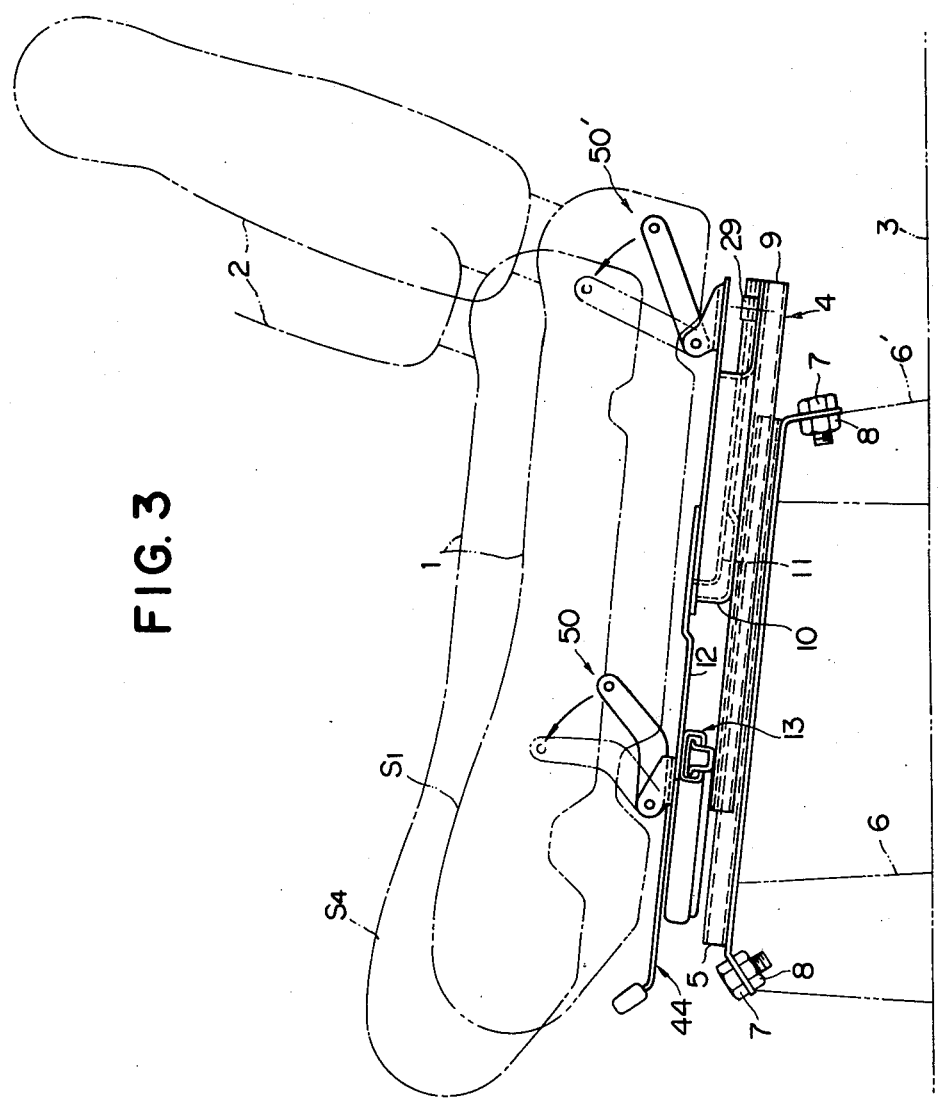
FIG. 3 is a side elevation view of a first embodiment of the support mechanism of a swivel seat structure according to the present invention.
Figure 4:
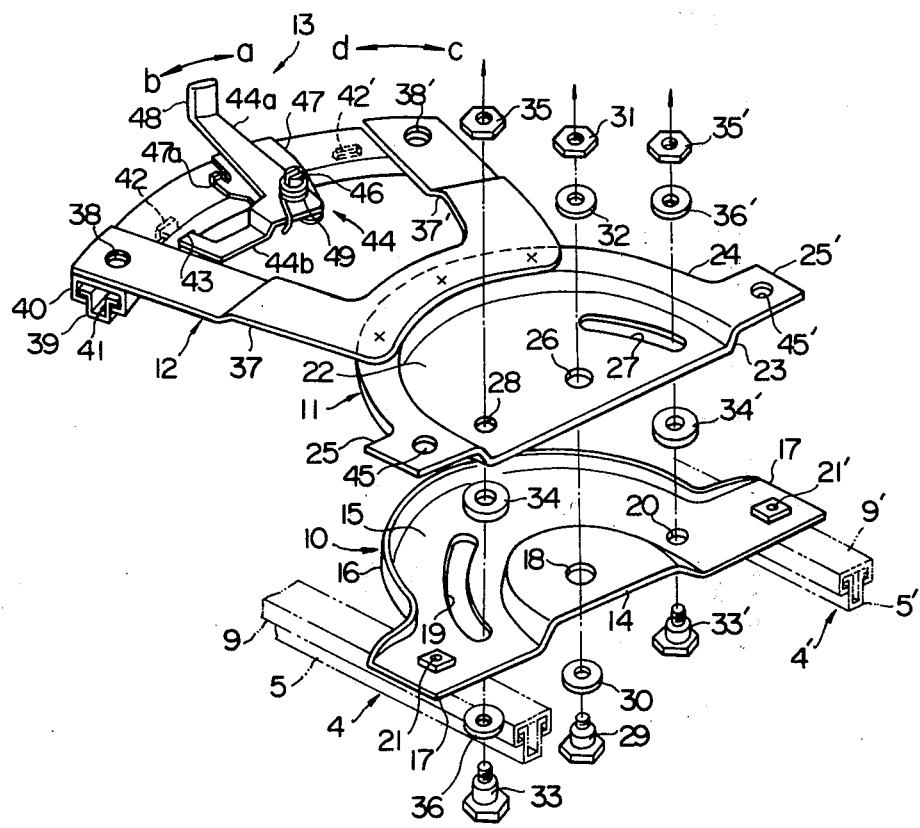
FIG. 4 is an exploded perspective view of the support mechanism of the swivel seat structure illustrated in FIG. 3.

As will be seen from the combination of FIGS. 3 and 4, the longitudinal guide structures 4 and 4' comprises stationary lower guide rails 5 and 5', respectively, which are secured to front and rear bracket members 6 and 6' by suitable fastening elements such as bolts 7 and nuts 8. The front and rear bracket members 6 and 6' are secured to or integral with the floor panel 3. In FIG. 3 of the drawings, the seat structure is shown as having the seat cushion 1 slightly inclined from the upper surface of the floor panel 3 upwardly toward its front end. In this connection, it is noted that the term "horizontal" herein used refers to any plane approximately parallel with the upper surface of the floor panel of a vehicle body and is not limited to a plane which is strictly horizontal in the exact sense of the word.

The above mentioned guide structures 4 and 4' further comprise movable upper guide rails 9 and 9', respectively. These guide rails 9 and 9' are held in slidable engagement with the stationary lower guide rails 5 and 5', respectively, and are thus longitudinally slidable thereon in fore-and-aft directions of the vehicle body.

The support mechanism of the swivel seat structure embodying the present invention further comprises a stationary base member 10 horizontally secured to the movable upper guide rails 9 and 9', a swivel member 11 pivotally movable horizontally with respect to the base member 10, a bracket member 12 secured to the swivel member 11, and a manually-operated locking assembly 13 for locking the swivel member 11 in a selected one of predetermined angular positions with respect to the base member 10.

Figure 5:
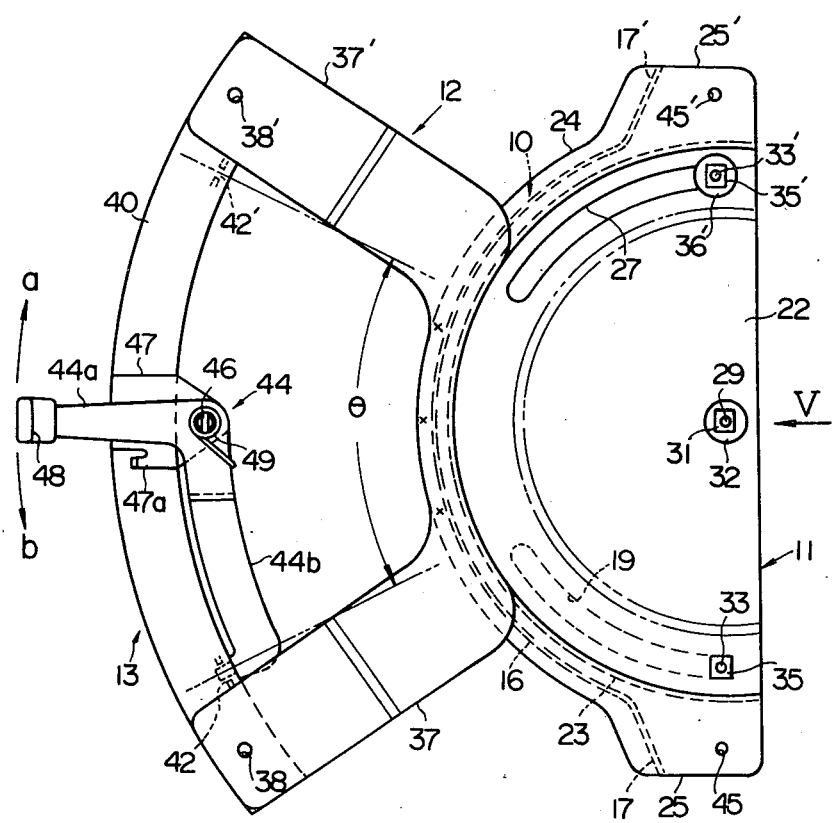
FIG. 5 is a plan view of the support mechanism illustrated in FIG. 4.

As will be clearly seen from FIG. 5 of the drawings, the base member 10 has a generally semicircular configuration and comprises a raised central land portion 14, an arcuate, downwardly dished portion 15 semicircularly surrounding a front part of the central land portion 14 and protruding forwardly from the land portion 14, an upstanding wall portion 16 projecting upwardly from the semicircular perimeter of the dished portion 15 and arcuately extending about center axis of a pivot element 29, and a pair of lateral lug portions 17 and 17' laterally projecting in opposite directions from the rear ends of the dished portion 15. The central land portion 14 is lower than the upstanding wall portion 16 as will be seen from the illustration by broken lines in FIG. 3 and is formed with a circular opening 18 having a vertical center axis. The semicircular perimeter of the central land portion 14 and the upstanding wall portion 16 of the base member 10 extend about the vertical center axis of the opening 18 thus formed in the land portion 14. Furthermore, the arcuate dished portion 15 of the base member 10 is formed with an arcuate slot 19 arcuately extending about the center axis of the opening 18. The dished portion 15 is further formed with a hole 20.

The base member 10 thus shaped is securely attached to rear portions of the movable upper guide rails 9 and 9' by suitable fastening elements (not shown) through holes 21 and 21' formed in the lug portions 17 and 17', respectively, of the base member 10.

The swivel member 11 also has a generally semicircular configuration and comprises a semicircular, downwardly dished portion 22 semicircularly protruding forwardly from the center axis of the pivot element 29, an upstanding wall portion 23 projecting upwardly from the semicircular perimeter of the dished portion 22, an arcuate flange portion 24 radially projecting outwardly from the upper end of the upstanding wall portion 23, and a pair of lateral lug portions 25 and 25' laterally projecting in opposite directions from the rear ends of the flange portion 24. The dished portion 22 is formed with a circular opening 26 having a vertical center axis. The upstanding wall portion 23 and accordingly the flange portion 24 of the swivel member 11 semicircularly extend about the vertical center axis of the opening 26. The dished portion 22 is further formed with an arcuate slot 27 and a hole 28. The arcuate slot 27 extends arcuately about the center axis of the opening 26. The swivel member 11 thus shaped is securely attached to the bottom of the seat cushion 1 by suitable fastening elements such as bolts, screws or studs (not shown) through holes 45 and 45' formed in the lateral lug portions 25 and 25', respectively, of the swivel member 11.

The swivel member 11 is pivotally mounted on the base member 10 by means of the pivot element 29 having a head portion, a plain shank portion and a threaded end portion. The pivot element 29 is axially passed through the circular opening 18 in the raised land portion 14 of the base member 10 with a washer 30 interposed between the head portion of the pivot member 29 and the lower face of the land portion 14 of the base member 10. The pivot element 29 is further axially passed through the circular opening 26 in the dished portion 22 of the swivel member 11 and is clamped to the swivel member 11 by means of a nut 31 tightened to the threaded portion of the pivot element 29 with a washer 32 interposed between the nut 31 and the upper face of the dished portion 22 of the swivel member 11, as will be best seen from FIG. 6 of the drawings. Thus, the pivot member 29 has its shank portion slidably received in the opening 18 in the lower base member 10 and the opening 26 in the swivel member 11 so that the swivel member 11 and accordingly the seat cushion 1 supported thereon is pivotally movable with respect to the base member 10 and accordingly the floor panel 3 about the vertical center axis of the pivot member 29.

The swivel member 11 being thus assembled to the base member 10 by means of the pivot element 29, the dished portion 22 of the swivel member 11 is slidably received on the upper face of the raised central land portion 14 of the base member 10 and the upstanding wall portion 16 of the base member 10 is slightly spaced apart radially outwardly from the upstanding wall portion 23 of the swivel member 11 and will be seen from the illustration by the broken lines in FIG. 3. The upstanding wall portion 16 of the base member 10 is thus located outside the upstanding wall portion 23 of the swivel member 11 and is held in slidable contact at its upper end with the lower face of the flange portion 24 of the swivel member 11 as will also be seen from the illustration of FIG. 3.

With the base member 10, swivel member 11 and pivot element 29 constructed and arranged as described above, the pivot element 29 is located closer to the rear end of the seat cushion 1 than to the front end of the seat cushion 1.

The arcuate slot 19 in the base member 10 and the arcuate slot 27 in the swivel member 11 are sized so that the central angles respectively subtended by the slots 19 and 27 are substantially equal to each other. Furthermore, the hole 20 in the base member 10 and the hole 28 in the swivel member 11 are respectively arranged in the base and swivel members 10 and 11 in such a manner that the hole 20 is vertically aligned with one end portion of the arcuate slot 27 and the hole 28 is vertically alinged with a similar end portion of the arcuate slot 19 when the seat cushion 1 and accordingly the base member 11 are directed forwardly. In the embodiment herein shown, the seat cushion 1 is assumed to be pivotally movable clockwise about the center axis of the pivot element 29 when the seat structure is viewed from above. Thus, the holes 20 and 28 in the base and swivel members 10 and 11, respectively, are shown arranged in such a manner that the hole 20 is located below the clockwise end portion of the arcuate slot 27 and the hole 28 is located above the counter-clockwise end portion of the arcuate slot 19 when the seat cushion 1 is held in the forwardly facing position about the center axis of the pivot element 29 as will be best seen from FIG. 5.

The slot 19 and hole 20 in the base member 10 and the slot 27 and hole 28 in the swivel member 11 form part of retaining means for providing retaining engagement between the base member 10 and the swivel member 11 without impeding the pivotal motion of the latter with respect to the former through an angle within a predetermined range from and back to the forwardly directed position of the swivel member 11.

In FIGS. 4, 5 and 6 of the drawings, such retaining means is shown comprising retainer pins 33 and 33' each essentially similar to the pivot element and thus having a head portion, a plain shank portion and a threaded end portion. The retainer pin 33 is axially passed through the slot 19 in the base member 10 and further through the hole 28 in the swivel member 11 with a slider ring 34 interposed between the base and swivel members 10 and 11. Likewise, the retainer pin 33' is axially passed through the hole 20 in the base member 10 and further through the slot 27 in the swivel member 11 with a slider ring 34' interposed between the base and swivel members 10 and 11. The retainer pin 33 is axially clamped to the base member 10 and the swivel member 11 by means of a nut 35 tightened to the threaded portion of the pin 33 with a washer 36 interposed between the base member 10 and the head portion of the retainer pin 33. Similarly, the retainer pin 33' is axially clamped to the base member 10 and the swivel member 11 by means of a nut 35' tightened to the threaded portion of the retainer pin 33' with a washer 36' interposed between the nut 35' and the swivel member 11. Thus, the retainer pins 33 and 33' have their respective shank portions axially passed through the slider rings 34 and 34', respectively, provided between the base member 10 and the swivel member 11 as will be best seen from FIG. 6. The retainer pin 33 is held against movement with respect to the swivel member 11 and is movable with respect to the base member 10 along the arcuate slot 19 in the base member 10 between a position located at the counter-clockwise end of the slot 19 and a position located at the clockwise end of the slot 19. On the other hand, the retainer pin 33' is held against movement with respect to the stationary base member 10 and permits the swivel member 11 to turn with respect to the base member 10 between a position having the pin 33' located at the clockwise end of the slot 27 and a postion having the pin 33' located at the counter-clockwise end of the slot 27.

Thus, the swivel member 11 is pivotally movable with respect to the base member 10 about the center axis of the pivot element 29 between a counter-clockwise limit angular position having the retainer pin 33 located at the counter-clockwise end of the slot 19 and the retainer pin 33' located at the clockwise end of the slot 27 and a clockwise limit angular position having the retainer pin 33 located at the clockwise end of the slot 19 and the retainer pin 33' located at the counter-clockwise end of the slot 27. When the swivel member 11 is held in the counter-clockwise limit angular position thereof with respect to the base member 10, the seat cushion 1 assumes the forwardly facing position thereof. When the swivel member 11 is turned to the clockwise limit angular position thereof, the seat cushion 1 assumes the clockwise turned position thereof with respect to the base member 10. The central angle between the counter-clockwise and clockwise limit angular positions is dictated by the length of each of the slots 19 and 27 or, in other words, the central angle subtended by each of the slots 19 and 27, as will be readily understood.

On the other hand, the bracket member 12 has a generally V-shaped configuration with a blunt bottom and comprises an intermediate base portion and a pair of arm portions 37 and 37' projecting from the opposite ends of the base portion. The base portion of the bracket member 12 is securely attached to the upper face of the flange portion 24 of the swivel member 11. The arm portions 37 and 37' project radially forwardly from the flange portion 24 of the swivel member 11 and are angularly spaced apart from each other through a suitable angle. The arm portions 37 and 37' are formed with holes 38 and 38', respectively, in their front end portions.

The manually-operated locking assembly 13 is largely composed of a stationary lower arcuate guide rail 39 and a movable upper arcuate guide rail 40. The stationary lower arcuate guide rail 39 is securely attached to front portions of the movable upper guide rails 9 and 9' of the previously described longitudinal guide structures 4 and 4' by suitable fastening elements (not shown) through holes 41 formed in the guide rail 39 (FIG. 4). The movable upper arcuate guide rail 40 is held in slidable engagement with the lower arcuate guide rail 39 and is thus movable in an arc on and along the guide rail 39. Furthermore, the guide rail 40 is secured to the respective front end portions of the arm portions 37 and 37' of the bracket member 12 by suitable fastening elements (not shown) through the holes 38 and 38' formed in the arm portions 37 and 37', respectively. The guide rails 39 and 40 are arcuately curved about the center axis of the pivot element 29 as will be best seen from FIG. 5. In the embodiment herein shown, the locking assembly 13 is positioned below a front end portion of the seat cushion 1 as will also be best seen from FIG. 3.

The lower arcuate guide rail 39 has a rear wall portion formed with first and second apertures 42 and 42' which are open toward the swivel member 11. The apertures 42 and 42' are angularly spaced apart from each other about the center axis of the pivot element 29 through a predetermined angle $\theta$. The central angle $\theta$ between the apertures 42 and 42' is substantially equal to or slightly smaller than the previously mentioned central angle subtended by each of the arcuate slots 19 and 27 in the base and swivel members 10 and 11, respectively. The upper arcuate guide rail 40 also has a rear wall portion formed with a single aperture 43 which is open toward the rear wall portion of the lower arcuate guide rail 39. The aperture 43 thus formed in the rear wall portion of the upper arcuate guide rail 40 is forwardly aligned with the first aperture 42 in the lower arcuate guide rail 39 when the guide rail 40 assumes a predetermined first angular position with respect to the guide rail 39 and with the second aperture 42 in the lower arcuate guide rail 39 when the guide rail 40 assumes a predetermined second angular position with respect to the guide rail 39.

The lower arcuate guide rail 39 has front and rear horizontally flange portions respectively directed forwardly and rearwardly away from each other and, on the other hand, the upper arcuate guide rail 40 has front and rear horizontal flange portions respectively directed rearwardly and forwardly toward each other, as will be best seen from FIG. 4. When the upper arcuate guide rail 40 is urged upwardly, the front and rear flange portions of the lower arcuate guide rail 39 are brought into retaining engagement with the front and rear flange portions, respectively, of the upper arcuate guide rail 40. Such retaining engagement is conducive to dampening the energy of a rearward impact which may be exerted on the seat back 2 during a collision at the rear of the vehicle.

The upper arcuate guide rail 40 is selectively locked in one of the above mentioned first and second angular positions thereof with respect to the lower arcuate guide rail 39 by a manually-operated locking lever 44. The locking lever 44 is in the form of a bell-crank lever and, thus, has an intermediate fulcrum portion and two arm portions 44a and 44b projecting from the fulcrum portion and angularly spaced apart from each other about the fulcrum portion. The fulcrum portion of the locking lever 44 is pivotally connected by a pin 46 to a bracket member 47 which is secured to a lengthwise intermediate portion of the upper arcuate guide rail 40. The pin 46 has a vertical center axis so that the locking lever 44 is pivotally movable horizontally about the center axis of the pin with respect to the upper arcuate guide rail 40. One arm portion 44a of the locking lever 44 extends forwardly from the fulcrum portion of the lever 44 and has an upstanding knob 48 at its leading end. The other arm portion 44b of the locking lever 44 partially extends along the rear wall portion of the guide rail 40 and partially projects into the guide rail 40 through the aperture 43 in the guide rail 40.

The locking lever 44 thus constructed and arranged is provided with biasing means adapted to urge the lever 44 to turn about the center axis of the pin 46 in a direction indicated by arrowhead a in FIGS. 4 and 5, viz., the direction in which the arm portion 44b is to move deeper into the upper arcuate guide rail 40 through the aperture 43 therein. In FIGS. 4 and 5, such biasing means is shown comprising a helical torsion spring 49 which is anchored at one end thereof to the fulcrum portion of the lever 44 and at the other end thereof to a split end portion of the pin 46. Thus, the arm portion 44b of the locking lever 44 is permitted to project into the lower arcuate guide rail 39 through the first aperture 42 or the second aperture 42' when the upper arcuate guide rail 40 assumes the previously mentioned first angular postition or the second angular position, respectively, thereof with respect to the lower arcuate guide rail 39. The bracket member 47 has a stop portion 47a engageable with the arm portion 44a of the locking lever 44 so that the locking lever 44 is prevented from being turned beyond a predetermined angular position with respect to the guide rail 40 in a direction indicated by arrowhead b in FIGS. 4 and 5, viz., in the direction opposite to the direction in which the lever 44 is urged to turn by the torsion spring 49. The stop portion 47a of the bracket member 47 is thus effective to prevent the arm portion 44b of the lever 44 from being disengaged from the guide rail 40 when the lever 44 is manually operated to turn about the center axis of the pin 46 in the direction of the arrowhead b against the force of the spring 49.

When, now, the upper arcuate guide rail 40 is held in the first angular position thereof with respect to the lower arcuate guide rail 39, the aperture 43 in the former is aligned with the first aperture 42 in the latter so that the arm portion 44b of the locking lever 44 projects not only into the upper arcuate guide member 40 through the aperture 43 but into the lower arcuate guide rail 39 through the aperture 42. The upper arcuate guide rail 40 is thus locked in the first angular position thereof with respect to the lower arcuate guide rail 39. Under these conditions, the swivel member 11 is held in the counter-clockwise limit angular position thereof with the retainer pin 33 located at the counter-clockwise end of the arcuate slot 19 in the base member 10 and the retainer pin 33' located at the clockwise end of the arcuate slot 27 in the swivel member 11 as shown in FIG. 5. When the swivel member 11 is thus held in the counter-clockwise limit angular position thereof with respect to the base member 10, the seat cushion 1 is maintained in the forwardly-facing position thereof as indicated by $S_1$ in FIG. 7.

When the locking lever 44 is manually operated to turn in the direction of the arrowhead b against the opposing force of the torsion spring 49 until the arm portion 44a of the lever 44 is brought into abutting contact with the stop portion 47a of the bracket member 47, the arm portion 44b of the lever 44 is moved out of the lower arcuate guide rail 39 through the aperture 42 in the guide rail 39. The arm portion 44b of the locking lever 44 being thus disengaged from the lower arcuate guide rail 39, the upper arcuate guide rail 40 carrying the locking lever 44 thereon is free to move on and along the lower arcuate guide rail 39 from the first limit angular position with respect to the guide rail 39.

When the seat cushion 1 is thereafter driven to turn about the center axis of the pivot element 29 clockwise from the forwardly-facing position $S_1$ thereof with respect to the vehicle body by, for example, the occupant of the seat structure, the swivel member 11 is also driven to turn about the center axis of the pivot element 29 clockwise from the counter-clockwise limit angular position thereof with respect to the base member 10. As a result of such a pivotal motion of the swivel member 11 with respect to the base member 10, the upper arcuate guide rail 40 connected to the swivel member 11 through the bracket member 12 is caused to slide on and along the stationary lower arcuate guide rail 39 from the first angular position with respect to the guide rail 39 and is thus turned with respect to the base member 10 about the center axis of the pivot element 29 as indicated by arrowhead c in FIGS. 4 and 5. While the upper arcuate guide rail 40 is sliding on the lower arcuate guide rail 39, the arm portion 44b of the locking lever 44 is held in pressing and sliding contact with the outer face of the rear wall portion of the guide rail 39 by the force of the torsion spring 49 if the locking lever 44 is released from the manipulative effort applied to the lever 44.

When the seat cushion 1, swivel member 11 and upper arcuate guide rail 40 are turned through the predetermined angle $\theta$ from the initial angular positions about the center axis of the pivot element 29, the aperture 43 in the upper arcuate guide rail 40 is brought into alignment with the second aperture 42' in the lower arcuate guide rail 39. The locking lever 44 is now permitted to be turned in the direction of the arrow a with respect to the lower and upper arcuate guide rails 39 and 40 by the force of the torsion spring 49 and causes the arm portion 44b thereof to move into the lower arcuate guide rail 39 through the second aperture 42' in the guide rail 39. The arm portion 44b of the locking lever 44 being thus engaged by the lower arcuate guide rail 39, the upper arcuate guide rail 40 is then locked to the lower arcuate guide rail 39 and is thus held in the previously mentioned second limit angular position thereof with respect to the lower arcuate guide rail 39.

While the upper arcuate guide rail 40 is being moved on the lower arcuate guide rail 39 as above described, the swivel member 11 rigidly connected to the upper arcuate guide rail 40 by means of the bracket member 12 is caused to turn about the center axis of the pivot element 29 clockwise from the counter-clockwise limit angular position thereof with respect to the base member 10. When the swivel member 11 is being thus turned with respect to the base member 10, the retainer pin 33 is moved in an arc through the arcuate slot 19 in the base member 10 from the counter-clockwise end of the slot 19 toward the clockwise end of the slot 19. On the other hand, the retainer pin 33' initially located at the clockwise end of the arcuate slot 27 in the swivel member 11 is approached by the counter-clockwise end of the slot 27 as the swivel member 11 is turned about the cemter axis of the pivot element 29 clockwise with respect to the base member 10.

When the upper arcuate guide rail 40 is moved into the second limit angular position thereof with respect to the lower arcuate guide rail 39 and is thus locked to the guide rail 39 as described hereinbefore, the swivel member 11 assumes the clockwise limit angular position thereof about the center axis of the pivot element 29 with respect to the base member 10. The seat cushion 1 is now turned about the center axis of the pivot element 29 through the predetermined angle $\theta$ from the initial forwardly-facing position $S_1$ and is held in the clockwise-turned position with respect to the vehicle body as indicated by $S_2$ in FIG. 7.

To have the seat cushion 1 is returned from the clockwise-turned position $S_2$ to the original forwardly-facing position $S_1$ thereof, the locking lever 44 is first disengaged from the lower arcuate guide rail 39 through the second aperture 42' in the rail 39. The seat cushion 1 and accordingly the swivel member 11 is thereafter turned in the direction of arrow d about the center axis of the pivot element 29 by, for example, the occupant of the seat structure until the arm portion 44b of the locking lever 44 is permitted to project into the lower arcuate guide rail 39 through the first aperture 42 in the rail 39.

The seat structure embodying the present invention can be turned from the normal forwardly-facing position $S_1$ not only to the clockwise-turned position $S_2$ as described above but to a backwardly-retracted forwardly-facing position $S_3$ on and along the longitudinal guide structures 4 and 4' on the floor panel 3 as indicated in FIG. 7 and to an upwardly-raised position $S_4$ by means of seat lifter units 50 and 50' as indicated in FIG. 3.

Figure 8:
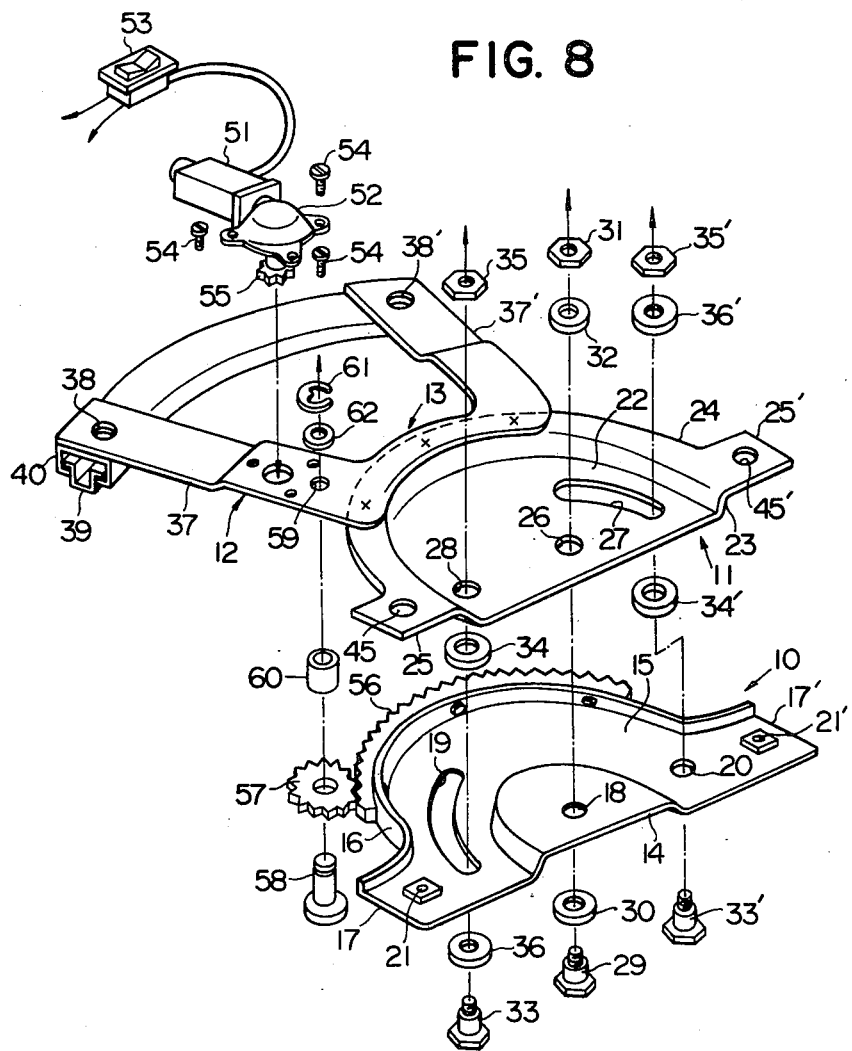
FIG. 8 is a view similar to FIG. 4 but shows a second embodiment of the support mechanism of a swivel seat structure according to the present invention.

FIG. 8 of the drawings illustrates a second embodiment of the support mechanism of a swivel seat structure according to the present invention. The embodiment herein shown is a modification of the embodiment hereinbefore described with reference to FIGS. 3 to 6 and is characterized by addition of a powered rotary seat drive system for driving the seat cushion 1 to turn between the forwardly-facing position $S_1$ and the clockwise turned position $S_2$ (FIG. 7) by supplied power. The embodiment shown in FIG. 8 is in other respects entirely similar to the embodiment of FIGS. 3 to 6.

In the embodiment of FIG. 8, the powered rotary seat drive system is largely composed of drive means and driving power transmitting means operatively intervening between the drive means and the swivel member 11 of the support mechanism. The drive means in turn comprises an electric motor 51 and a speed reduction gear unit 52 coupled to the output shaft of the motor 51. The motor 51 is of the reversible type and is electrically connected to a suitable power source through a manually-operated main seat drive switch (not shown) and a manually-operated two-position switch 53 adapted to alter the polarity of the current to be supplied to the motor 51 through the main seat drive switch. The motor 51 and the speed reduction gear unit 52 are securely mounted on the bracket member 12 by suitable fastening elements such as screws 54 in such a manner that the output shaft of the reduction gear unit 52 has a center axis in a vertical direction.

On the other hand, the driving power transmitting means of the rotary seat drive system comprises a pinion gear 55 on the output shaft of the speed reduction gear unit 52, an arcuate toothed rack member 56 on the swivel member 11, and an idler gear 57 intervening between the pinion gear 55 and the geared rack member 56. The pinion gear 55 is securely connected to the output shaft of the speed reduction gear unit 52 and is thus rotatable about the vertical center axis of the output shaft. The gear rack member 56 is securely attached to the curved outer face of the arcuate upstanding wall portion 16 of the base member 10 by suitable fastening means such as screws. The idler gear 57 is rotatably fitted to a pin 58 axially passed through a hole 59 formed in one of the arm portions such as the arm portion 37 of the bracket member 12. The pin 58 has a head portion and is axially held in position with respect to the pinion gear 55 and the rack member 56 by means of a collar 60 interposed between the head portion of the pin 58 and the arm portion 37 of the bracket member 12. The pin 58 and accordingly the idler gear 57 are retained to the arm portion 37 of the bracket member 12 by means of a retainer element 61 fitted into a circumferential groove in a leading end portion of the pin 58 with a washer 62 interposed between the retainer element 61 and the bracket member 12. The hole 59 in the arm portion 37 of the bracket member 12 is located so that the idler gear 57 thus carried by the bracket member 12 is held in mesh on one side with the pinion gear 55 and on the other side with the geared rack member 56.

When, now, the main seat drive switch is manually operated to close with the two-position switch 53 held in one position thereof, a current is supplied in one direction to the motor 51 and causes the output shaft of the motor 51 to rotate in one direction about the center axis thereof. The rotation of the output shaft of the motor 51 is reduced in speed by the speed reduction gear unit 52 and is thereafter transmitted through the pinion gear 55 and the idler gear 57 to the geared rack member 56 on the swivel member 11. Thus, the swivel member 11 is driven to turn in one direction about the center axis of the pivot element 29 with respect to the stationary base member 10 and accordingly to the floor panel of the vehicle body until the main seat drive switch is made open.

When the main seat drive switch is manipulated to close with the two-position switch 53 held in the other position thereof, the motor 51 is operative to drive the swivel member 11 for rotation in the other direction about the center axis of the pivot element 29 with respect to the base member 10 until the main seat drive switch is made open.

As the swivel member 11 is thus driven to turn clockwise or counter-clockwise about the center axis of the pivot element 29 with respect to the base member 10, the seat cushion 1 is turned clockwise from the normal forwardly-facing position $S_1$ to the clockwise-turned position $S_2$ or counter-clockwise from the position $S_2$ to the position $S_1$ with respect to the floor panel of the vehicle body.

The main seat drive switch for use in the seat drive system thus operative is preferably provided in combination with limit switches adapted to automatically open in response to arrival of the seat cushion 1 at predetermined positions such as the previously mentioned forwardly-facing position $S_1$ and the clockwise-turned position $S_2$ (FIG. 7) of the seat cushion 1.

If desired, the pinion gear 55 may be held in direct mesh with the geared rack member 56 by dispensing with the idler gear 57 from the arrangement shown.

Figure 9:
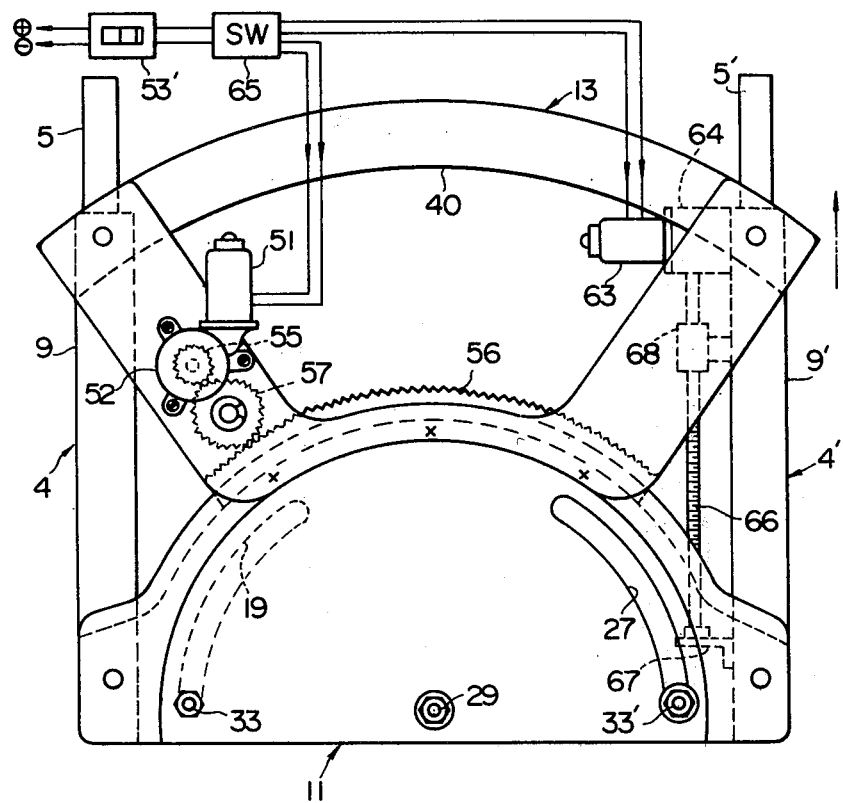
FIG. 9 is a view also similar to FIG. 4 but shows a third embodiment of the support mechanism of a swivel seat structure according to the present invention.

In FIG. 9 of the drawings is illustrated a third embodiment of the support mechanism of a swivel seat structure according to the present invention. The embodiment shown in FIG. 9 is a further modification of the embodiment of FIG. 8 and is characterized by addition of a powered fore-and aft seat drive system for driving the seat cushion 1 for movement between the normal forwardly-facing position $S_1$ and the backwardly-retracted forwardly-facing position $S_3$ (FIG. 7) by supplied power. The embodiment shown in FIG. 9 is in other respects entirely similar to the embodiment of FIG. 8.

In the embodiment of FIG. 9, the powered fore-and-aft seat drive system is largely composed of drive means and driving power transmitting means intervening between the drive means and one of the movable upper guide rails 9 and 9' of the longitudinal guide structures 4 and 4' such as the guide rail 9' as shown. The drive means in turn comprises an electric motor 63 and a speed reduction gear unit 64 coupled to the output shaft of the motor 63. The motor 63 and the motor 51 of the rotary seat drive system are electrically connected to a suitable power source through a manually-operated main seat drive switch (not shown), a manually-operated two-position switch 53' and a manually-operated selector switch 65. The selector switch 65 has two different positions consisting of a first position providing connection between the power source and the motor 51 of the rotary seat drive system across the main seat drive switch and the two-position switch 53' and a second position providing connection between the power source and the motor 63 of the fore-and-aft seat drive system across the main seat drive switch and the two-position switch 53'. The two-position switch 53' is adapted to alter the polarity of the current to be supplied to the motor 51 or the motor 63 through the main seat drive switch and the selector switch 65. The motor 63 and the speed reduction gear unit 64 of the fore-and-aft seat drive system are securely connected to the stationary lower guide rail 5' by suitable fastening means (not shown).

On the other hand, the driving power transmitting means of the fore-and-aft seat drive system comprises a screw rod 66 having a center axis in a direction parallel with the direction in which the movable upper guide rails 9 and 9' and accordingly the seat cushion 1 are movable back and forth with respect to the stationary lower guide rails 5 and 5'. The screw rod 66 is at one end connected to or engaged by a final drive element (not shown) of the speed reduction gear unit 64 and at the other end thereof journaled in a bearing member 67 securely attached to the guide rail 5' as indicated by broken lines in FIG. 9 so as to be held against axial movement with respect to the guide rail 5' and accordingly to the floor panel of the vehicle body. The screw rod 66 is thus adapted to be driven by the speed reduction gear unit 64 for rotation in either direction about the center axis thereof when the motor 63 is in operation. Such a screw rod 64 is engaged by an internally threaded member 68 which is secured to the movable upper guide rail 9' as indicated also by broken lines in FIG. 9 and which is thus held against rotation about the center axis of the screw rod 66 with respect to the guide rail 9'. The combination of the screw rod 66 and the internally threaded member 68 is such that the internally threaded member 68 is caused to move in parallel with the center axis of the screw rod 66 when the screw rod 66 is driven for rotation about the center axis thereof.

When, now, the main seat drive switch is manually operated to close with the two-position switch 53' held in either of the two positions thereof and the selector switch 65 held in the first position thereof providing connection between the power source and the motor 51 of the rotary seat drive system, the seat cushion 1 is driven for pivotal motion in either direction about the center axis of the pivot element 29 as previously described in connection with the embodiment of FIG. 8.

When, on the other hand, the main seat drive switch is manually operated to close with the two-position switch 53' in one position thereof and the selector switch 65 held in the second position thereof providing connection between the power source and the motor 63 of the fore-and-aft seat drive system, a current is supplied in one direction to the motor 63 and causes the output shaft of the motor 63 to rotate in one direction about the center axis thereof. The rotation of the output shaft of the motor 63 is reduced in speed by the speed reduction gear unit 52 and is thereafter transmitted to the screw rod 66. The screw rod 66 is thus driven for rotation in one direction about the center axis thereof and drives the internally threaded member 68 to move in, for example, a forward direction with respect to the screw rod 66 until the main seat drive switch is made open.

When the main seat drive switch is manipulated to close with the two-position switch 53' held in the other position thereof and the selector switch 65 held in the second position thereof, the motor 63 of the fore-and-aft seat drive system is operative to drive the screw rod 66 to turn in the other direction about the center axis thereof. Thus, the screw rod 66 drives the internally threaded member 68 to move in, for example, a backward direction with respect to the screw rod 66.

As the internally threaded member 68 is thus driven to move forwardly or backwardly with respect to the screw rod 66, the movable upper guide rails 9 and 9' are moved also forwardly or backwardly on the stationary lower guide rails 5 and 5'. This causes the seat cushion 1 to move forwardly from the backwardly-retracted forwardly-facing position $S_3$ to the normal forwardly-facing position $S_1$ or backwardly from the position $S_1$ to the position $S_3$.

The main seat drive switch for use with the rotary and fore-and-aft seat drive systems thus operative is also preferably arranged in combination with limit switches adapted to automatically open in response to arrival of the seat cushion 1 at predetermined positions such as the position $S_2$ from the position $S_1$, the position $S_1$ from the position $S_2$, the position $S_3$ from the position $S_1$ and the position $S_1$ from the position $S_3$ (FIG. 7).

In the embodiment shown in FIG. 9, the speed reduction gear unit 64 and the bearing member 67 may be secured to the bracket member 6 and the stationary base member 10, respectively, or directly to the floor panel of the vehicle body.

From the foregoing description, it will have been appreciated that the support mechanism of a swivel seat structure proposed by the present invention has the following outstanding advantages over prior-art counterparts:

(1) The pivot element 29 is located closer to the rear end of the seat cushion than to the front end of the seat cushion 1 so that the seat forwardly overhangs the floor surface of the vehicle body an increased distance. A front end portion of the seat cushion 1 is therefore enabled to turn about the center axis of the pivot element 29 with an increased radius as compared to a rear end portion of the seat cushion. The front end portion of the seat cushion 1 is thus angularly displaced larger distance the rear end portion with a small swivel angle about the center axis of the pivot element 29. The rear end portion of the seat cushion 1 being displaced a small distance, the space on the inner side of the seat cushion 1 can be utilized effectively for the installation of, for example, a floor-mounted console box which is schematically indicated at 69 in FIG. 7.

(2) If the vehicle encounters a collision with the seat cushion 1 directed forwardly in the vehicle body and the seat back 2 is subjected to a violent rearward impact by the seat occupant who is flung rearwardly on the seat cushion, the upper arcuate guide rail 40 of the locking assembly 13 is forced to turn upwardly by the seat cushion 1 which is forced to lift at its front end. Under these conditions, the lower arcuate guide rail 39 of the locking assembly 13 is brought into retaining engagement with the upper arcuate guide rail 40 by the front and rear horizontal flange portions thereof and thereby takes up a major portion of the energy of the inpact applied to the seat back 2.

(3) If the occupant of the seat structure sits on a front outer corner portion (indicated at Sf in FIG. 7) of the seat cushion 1 which is held in the clockwise-turned position $S_2$ (FIG. 7) thereof, the downward load exerted on the particular portion of the seat cushion is borne by the upstanding wall portion 16 of the base member 10 though the flange portion 24 of the swivel member 11 received on the upper edge of the wall portion 16 of the base member 10. In this instance, the seat cushion 1 will have its rear inner corner portion subjected to an upward force which urges the swivel member 11 to move upwardly from the base member 10. Since, however, the swivel member 11 is retained to the base member 10 by means of the retainer pins 33 and 33', the swivel member 11 is prevented from being disengaged from the base member 10 and, as a consequence, the seat cushion 1 is prevented from being detached from the swivel member 11 and being deformed on the swivel member 11.

(4) The swivel member 11 is received on not only the raised central land portion 14 but the upstanding wall portion 16 of the base member 10 so that the swivel member 11 and accordingly the seat cushion 1 can be turned smoothly and stably on the base member 10.

(5) When the support mechanism of a swivel seat structure is provided with the longitudinal guide structures 4 and 4' for permitting the adjustment of the fore-and-aft position of the seat cushion 1 on the floor surface of the vehicle body, the seat cushion 1 can be first moved from the normal forwardly-facing position to the rearwardly-retracted forwardly-facing position and thereafter from the latter position to a clockwise or counter-clockwise turned position. If, thus, there is any member or structure such as the floor-mounted console box 69 or a center piller 70 that will obstruct the pivotal motion of the seat cushion from the normal forwardly-facing position directly to the clockwise or counter-clockwise turned position, the seat cushion can be moved into the turned position if the seat cushion is once moved into the rearwardly-retracted forwardly-facing position before the seat cushion is moved into the turned position.

While a few preferred embodiments of the support mechanism of a swivel seat structure according to the present invention have thus far been described with reference to the drawings, it should be borne in mind that such embodiments are simply illustrative of the subject matter of the present invention and are therefore subject to change and modification.

For example, the base member 10 which has been described to be mounted on the floor surface through the intermediary of the longitudinal guide structures 4 and 4' may be mounted directly on the floor surface. On the other hand, the locking assembly 13 which has been described and shown as being positioned below a front end portion of the seat cushion 1 may be arranged to be positioned below a central portion of the seat cushion 1. In this instance, the stationary lower arcuate guide rail 39 may be constructed integrally with the base member 11.

While, furthermore, it has been described that the seat cushion 1 and the swivel member 11 are pivotally movable clockwise from the forwardly-facing position thereof, the support mechanism of a swivel seat structure according to the present invention may be constructed and arranged to be rotatable in a counter-clockwise direction from the forwardly-facing position about the center axis of the pivot element 29.

What is claimed is:

1. A support mechanism of a swivel seat structure having a seat cushion horizontally positioned over a floor surface, comprising:
   a pivot element located below the seat cushion and having a center axis about which the seat cushion is horizontally turnable with respect to the floor surface, the center of the pivot element being closer to the rear end of the seat cushion than to the front end of the seat cushion;
   a base member which is held stationary with respect to the floor surface;
   a swivel member carrying the seat cushion thereon and pivotally mounted on said base member by means of said pivot element, the swivel member being horizontally turnable on the base member about the center axis of the pivot element;
   guide rails positioned below the seat cushion and in front of said pivot element and having an arcuate stationary guide rail which is held stationary with respect to the floor surface and an arcuate movable guide rail which is slidable on and along the stationary guide rail and which is secured to said swivel member for being turnable with the swivel member and the seat cushion about the center axis of said pivot element; and
   retaining means positioned between said pivot element and said guide rails and arranged to provide retaining engagement between the base member and the swivel member while permitting the swivel member to turn on and with respect to the base member, the retaining means comprising a retainer pin which is axially clamped to the base member and the swivel member for providing said retaining engagement between the base member and the swivel member.

2. A support mechanism of a swivel seat structure as set forth in claim 1, in which said bae member has a raised central land portion having said pivot element rotatably passed therethrough and a downwardly dished portion semicircularly protruding forwardly from the land portion, and in which said swivel member has a downwardly dished portion semicircularly protruding forwardly from the center axis of said pivot element and having said pivot element rotatably passed therethrough, the dished portion of the swivel member being slidably received on the upper face of the land portion of the base member.

3. A support mechanism of a swivel seat structure as set forth in claim 2, in which the dished portion of one of said base member and said swivel member is formed with an arcuate slot extending about the center axis of said pivot element and the dished portion of the other of the base member and the swivel member is formed with a hole which is vertically aligned with one end of said arcuate slot when the swivel member assumes a predetermined first limit angular position with respect to the base member and with the other end of the arcuate slot when the swivel member assumes a predetermined second limit angular position with respect to the base member, said first limit angular position and said second limit angular position being displaced through a predetermined angle about the center axis of said pivot element, and said retainer pin of said retaining means is axially passed through said arcuate slot and said hole and movable in and along the arcuate slot.

4. A support mechanism of a swivel seat structure as set forth in claim 3, in which said base member further has an upstanding wall portion projecting upwardly from the dished portion of the base portion and arcuately extending about the center axis of said pivot element and in which said swivel member further has an upstanding wall portion projecting upwardly from the dished portion of the swivel member and an arcuate flange portion radially projecting forwardly from the upstanding wall portion of the swivel member, said flange portion of the swivel member being slidably received on the upstanding wall portion of the base member.

5. A support mechanism of a swivel seat structure as set forth in claim 4, in which said guide rails are shaped so that said stationary guide rail is brought into retaining engagement with said movable guide rail when the movable guide rail is urged upwardly over the floor surface.

6. A support mechanism of a swivel structure as set forth in claim 4, in which said stationary guide rail is formed with first and second apertures angularly spaced apart from each other about the center axis of said pivot element through an angle substantially equal to the angle through which said swivel member is turnable between said first limit angular position and said second limit angular position thereof and in which said movable guide rail is formed with an aperture which is aligned with the first and second apertures in the stationary guide rail when said swivel member assumes the first and second limit angular positions, respectively, thereof with respect to said base member, said guide rails forming part of a locking assembly which further comprises a locking lever which is pivotally mounted on said movable guide rail and which has an arm portion passed through the aperture in the movable guide rail and engageable with the stationary guide rail through said first and second apertures when said swivel member assumes said first and second limit angular positions, respectively, thereof with respect to said base member.

7. A support mechanism of a swivel seat structure as set forth in one of claims 3 through 6, inclusive, further comprising a powered rotary seat drive system operative to drive the seat cushion for pivotal motion between a first predetermined angular position corresponding to said first limit angular position of the swivel member and a second predetermined angular position corresponding to said second limit angular position of the swivel member about the center axis of said pivot element.

8. A support mechanism of a swivel seat structure as set forth in claim 7, in which said powered rotary seat drive system comprise reversible drive means operative to selectively produce rotational motions in opposite directions, and driving power transmitting means operatively intervening between the drive means and said swivel member, said driving power transmitting means comprising an arcuate geared rack member secured to the base member and arcuately extending about the center axis of said pivot element and a gear which is in mesh with said geared rack member and operative to be driven by said rotational motions of said drive means.

9. A support mechanism of a swivel seat structure as set forth in claim 8, further comprising longitudinal guide structures mounted on the floor surface and including movable guide rails longitudinally movable with respect to the floor surface, said base member being securely carried on said movable guide rails of the longitudinal guide structures.

10. A support mechanism of a swivel seat structure as set forth in claim 9, further comprising a powered fore-and-aft seat drive system operative to drive the seat cushion for horizontal fore-and-aft movement between first and second predetermined positions with respect to he floor surface, the fore-and-aft seat drive system comprising drive means operative to selectively produce rotational motions in opposite directions, and driving power transmitting means operatively intervening between the drive means of the fore-and-aft seat drive system and said movable guide rails of said longitudinal guide structures and operative to convert the rotational motions of the drive means of the fore-and-aft seat drive system into corresponding linear movements in forward and backward directions, respectively, of said guide rails of the longitudinal guide structures.

11. A support mechanism of a swivel seat structure as set forth in claim 10, in which the driving power transmitting means of said fore-and-aft seat drive system comprises a screw rod axially extending in parallel with the guide rails of said longitudinal guide structures and held against axial movement with respect to the floor surface and an iternally threaded member engaging the screw rod and movable with the movable guide rails of said longitudinal guide structures, said screw rod being rotatable about the center axis thereof and being adapted to be driven for rotation about the center axis thereof by said rotational motions of the drive means of the fore-and-aft seat drive system.

* * * * *